(12) United States Patent
Suzuki et al.

(10) Patent No.: US 7,466,103 B2
(45) Date of Patent: Dec. 16, 2008

(54) BATTERY MODULE

(75) Inventors: Masato Suzuki, Naka (JP); Eiichi Toyota, Hitachinaka (JP); Motomi Shimada, Hitachinaka (JP); Takashi Kaneko, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 128 days.

(21) Appl. No.: 11/300,306

(22) Filed: Dec. 15, 2005

(65) Prior Publication Data

US 2006/0132090 A1 Jun. 22, 2006

(30) Foreign Application Priority Data

Dec. 17, 2004 (JP) ............................. 2004-365856

(51) Int. Cl.
*H02J 7/00* (2006.01)
*H01M 2/08* (2006.01)
*H01M 2/26* (2006.01)

(52) U.S. Cl. ..................... 320/112; 320/107; 429/161; 429/170; 429/179; 429/183

(58) Field of Classification Search .............. 320/107, 320/112; 429/161, 170, 172, 178, 179, 183
See application file for complete search history.

(56) References Cited

U.S. PATENT DOCUMENTS

| | | | | |
|---|---|---|---|---|
| 3,582,181 A | * | 6/1971 | Manau de Chveca | 359/379 |
| 5,308,715 A | * | 5/1994 | Aronne | 429/91 |
| 5,399,818 A | * | 3/1995 | Golbeck et al. | 200/52 R |
| 5,635,814 A | * | 6/1997 | Afzal et al. | 320/111 |
| 6,837,739 B2 | * | 1/2005 | Gorringe et al. | 439/474 |
| 2004/0138785 A1 | | 7/2004 | Emori et al. | |
| 2004/0257033 A1 | * | 12/2004 | Kubota et al. | 320/107 |

FOREIGN PATENT DOCUMENTS

| | | |
|---|---|---|
| EP | 1 083 619 | 3/2001 |
| GB | 2 088 158 | 6/1982 |
| JP | 6-96758 | 4/1994 |
| JP | 7-245095 | 9/1995 |
| JP | 2001-307779 | 11/2001 |
| JP | 2004-247322 | 9/2004 |
| WO | WO 03/098719 | 11/2003 |
| WO | WO 3098719 A1 * | 11/2003 |

* cited by examiner

*Primary Examiner*—Akm Enayet Ullah
*Assistant Examiner*—Johali A Torres Ruiz
(74) *Attorney, Agent, or Firm*—Antonelli, Terry, Stout & Kraus, LLP.

(57) ABSTRACT

The invention provides a battery module including an output breaker that ensures safe and prompt installation of batteries in a system. The battery module includes one or more batteries and a case housing the batteries and having output terminals, each output terminal being connected to a positive or negative electrode of the housed battery, the battery module further including means for turning on and off the connection between the output terminal and the positive or negative electrode of the battery. The means for turning on and off the connection may include a contact subjected to making and breaking operations and a screw for making and breaking the contact, the screw having an insulator at an interface with the contact.

3 Claims, 5 Drawing Sheets

BATTERY MODULE

The present application is based on and claims priority of Japanese patent application No. 2004-365856 filed on Dec. 17, 2004, the entire contents of which are hereby incorporated by reference.

BACKGROUND OF THE INVENTION

1. Field of the Invention

This invention relates to a method of safely constructing a power supply system in obtaining high voltage by series connection of a plurality of batteries.

2. Description of the Related Art

Automobile and railcar industries have been developing a system for driving an induction motor by a power converter using a storage battery as its power supply, which allows for construction of environment-friendly systems with high mileage, low emission, and low noise.

On the other hand, toward a high-capacity battery for use in the above system, a battery module having an output voltage of about 170 volts has been developed. A unit of two such battery modules connected in series is used in automobile applications. In railcar applications, in some cases, four such battery modules are connected in series.

Batteries, in contrast to capacitors, cannot be completely discharged. In particular, overdischarge accelerates degradation of storage batteries such as nickel metal hydride and lithium ion batteries. For this reason, special care must be taken to avoid electric shock in handling conventional battery modules as described above, which have a total voltage of as high as about 700 volts when four modules are connected in series.

SUMMARY OF THE INVENTION

An object of the invention is to provide a battery module including an output breaker that ensures safe and prompt installation of batteries in a system.

To achieve the above object, a battery module according to the invention includes a contact for switching the battery output and a means for making and breaking the contact. The contact and the switching means are located between the battery housed in the battery module and an output terminal provided in the module case.

More specifically, a battery module according to the invention includes one or more batteries and a case housing the batteries and having output terminals, each output terminal being connected to a positive or negative electrode of the housed battery, the battery module further including means for turning on and off the connection between the output terminal and the positive or negative electrode of the battery.

In an aspect of the invention, the means for turning on and off the connection includes a contact subjected to making and breaking operations and a screw for making and breaking the contact, the screw having an insulator at an interface with the contact.

According to the invention, a battery module itself has a battery output breaker, which avoids electric shock accidents during installation of battery modules in a system.

DETAILED DESCRIPTION OF THE PREFERRED EMBODIMENTS

Preferred embodiments of the battery module according to the invention will now be described with reference to the drawings.

First Embodiment

Figure 1:
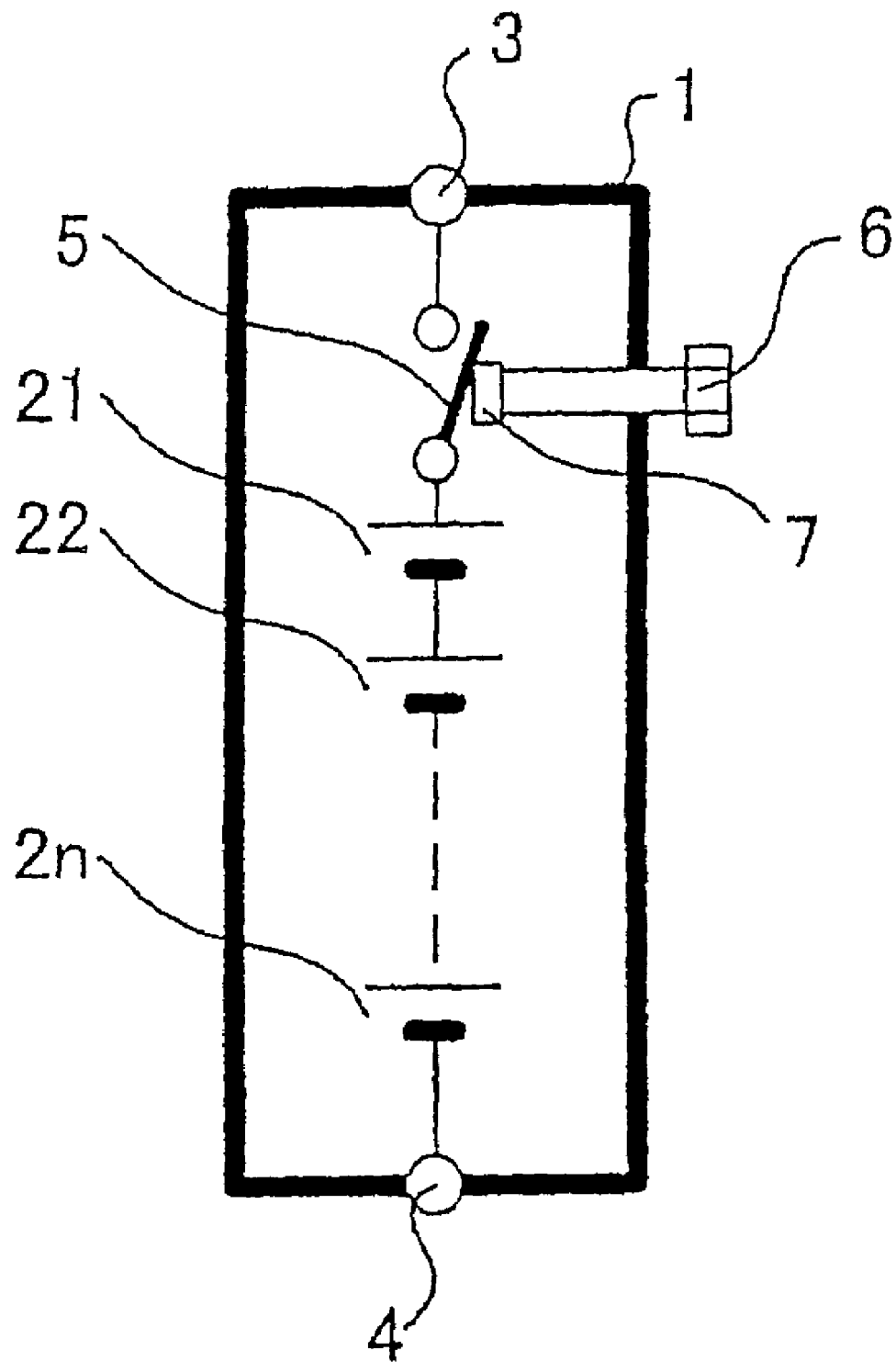
FIG. 1 shows the configuration of a battery module of a first embodiment.

FIG. 1 shows a circuit configuration of a battery module of a first embodiment. Unit cells 21, 22, ..., 2n are placed inside a case 1 of the battery module and connected in series. Likewise, a contact 5 is placed inside the case 1. The positive electrode of the unit cell 21 is connected to one terminal of the contact 5.

On the other hand, a positive output terminal 3 and a negative output terminal 4 are placed outside the case 1. The positive output terminal 3 is connected to the other terminal of the contact 5, and the negative output terminal 4 is connected to the negative electrode of the unit cell 2n. Furthermore, a contact manipulator composed of a screw 6 and an insulator 7 is placed at a position perpendicular to the contact 5 so as to pass through the case 1.

Figure 2:
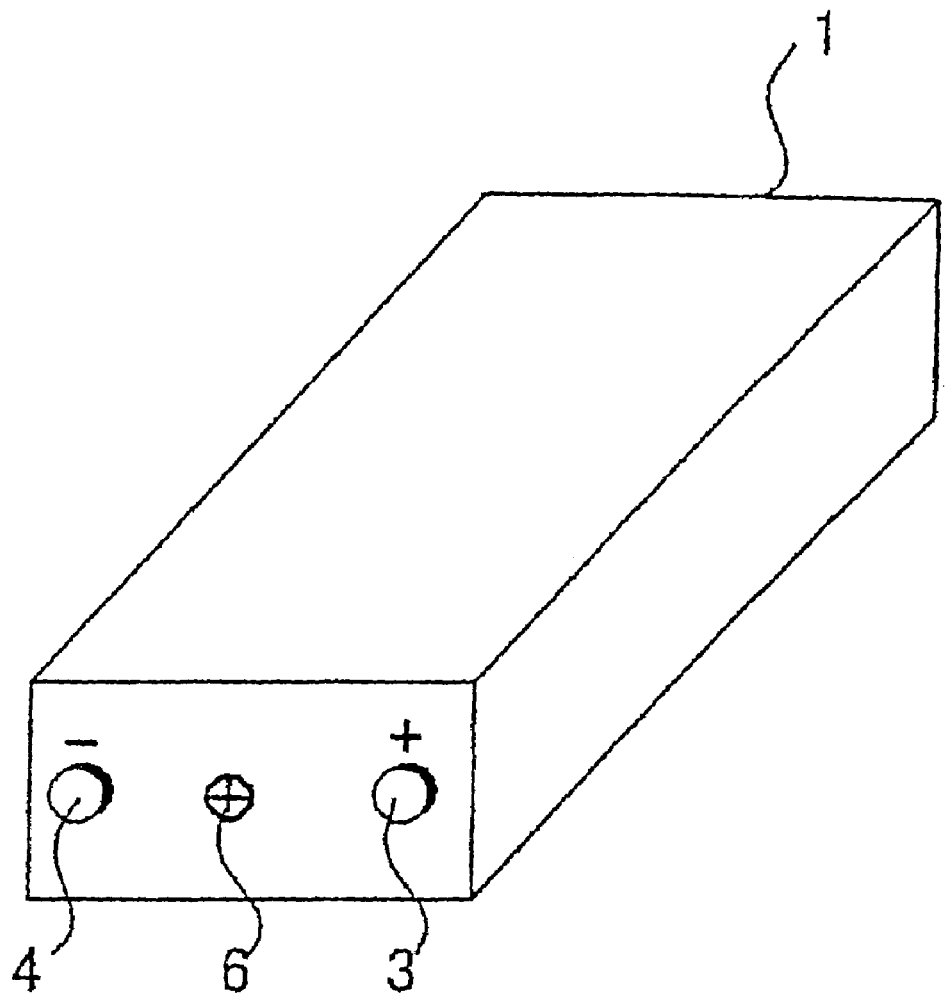
FIG. 2 shows the appearance of a battery module of the first embodiment.

FIG. 2 shows the appearance of a battery module having the above configuration. The case 1 is shaped as a rectangular parallelepiped. On one of its end faces, a positive output terminal 3 and a negative output terminal 4 are placed. A screw 6 is placed between the positive output terminal 3 and the negative output terminal 4.

Figure 3:
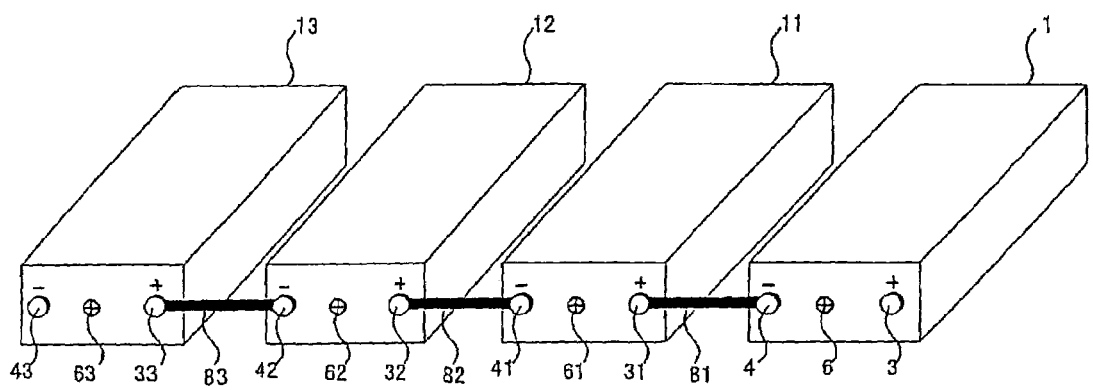
FIG. 3 shows an exemplary configuration of a battery system using the battery modules of the first embodiment.

FIG. 3 shows an example of this embodiment in which four battery modules are connected in series. The procedure for connecting the four battery modules, which are juxtaposed horizontally in FIG. 3, is as follows:

(1) First, each of the screws 6, 61, 62, and 63 of the battery modules is loosened to break the output of the battery.

(2) Next, wires 81, 82, and 83 are used to connect between the positive and negative electrodes of the battery modules, respectively.

(3) Finally, each of the screws 6, 61, 62, and 63 of the battery modules is tightened to couple the output of the battery to the output terminal.

In this embodiment, as described above, the output of the battery is not applied to the output terminal, which may be touched during the series connecting operation. This ensures safe and prompt installation of battery modules.

Second Embodiment

Figure 4:
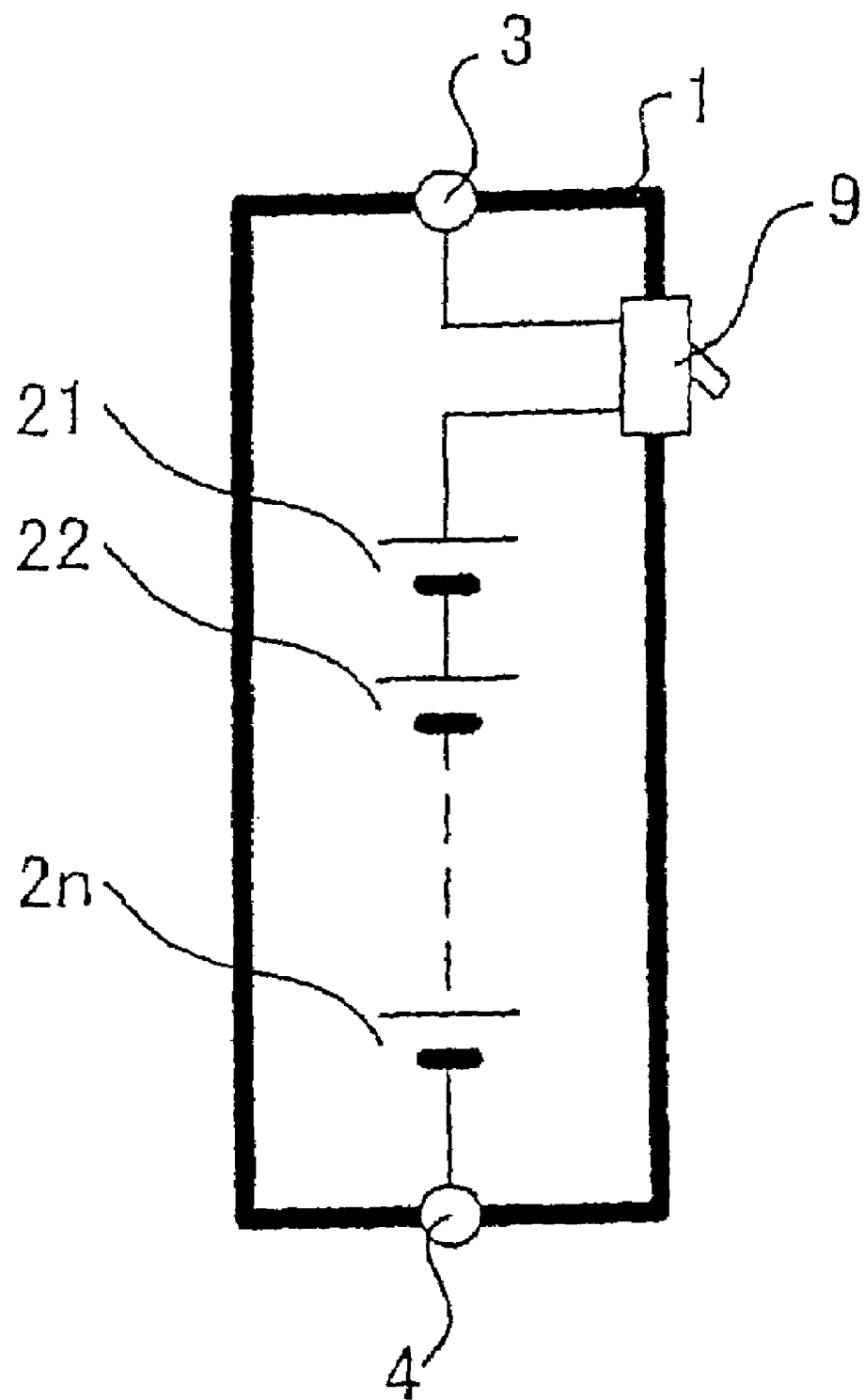
FIG. 4 shows the configuration of a battery module of a second embodiment.
Figure 5:
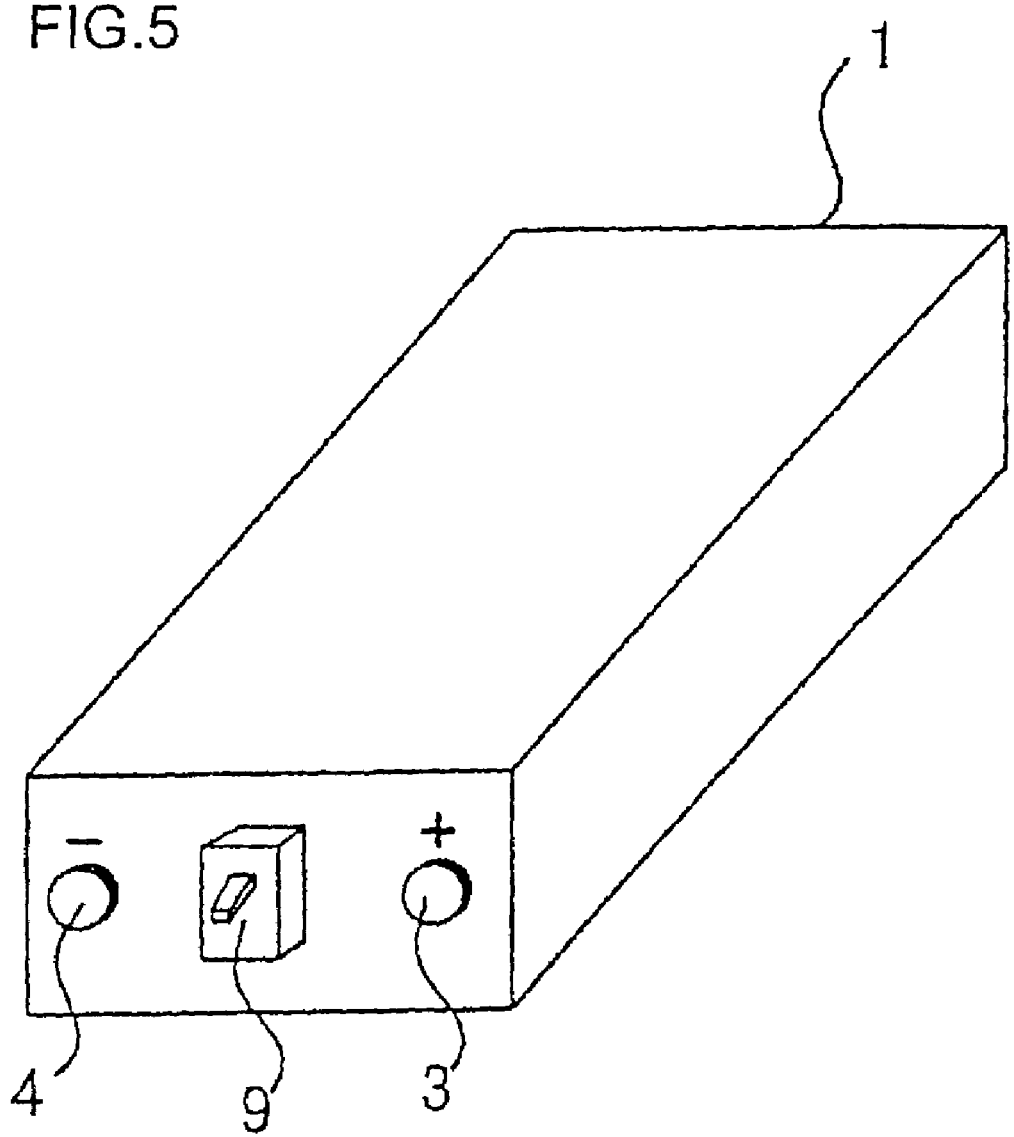
FIG. 5 shows the appearance of a battery module of the second embodiment.

FIGS. 4 and 5 show another embodiment of the invention. In this embodiment, a commonly-used FFB (Fuse Free Breaker) switch 9 is used as a means for switching the battery output.

FIGS. 4 and 5 show the configuration of the battery module of this embodiment. The same reference numerals as those in FIGS. 1 and 2 will not be further described because the meaning is left unchanged. In FIG. 4, the positive electrode of the unit cell 21 is connected to one terminal of the FFB switch 9, and the positive output terminal 3 is connected to the other terminal of the FFB switch 9. The subsequent procedure is the same as that described above with reference to FIG. 1. The FFB switch 9 is placed between the positive output terminal 3 and the negative output terminal 4 of the case 1 as shown in FIG. 5.

This embodiment also ensures safe and prompt installation of battery modules like the previous embodiment. At the same time, the overcurrent sensing feature of the FFB switch prevents degradation of batteries due to overcharge and overdischarge.

What is claimed is:

1. A battery module including one or more batteries and a case housing the battery or the batteries and having output terminals mounted on the case, each output terminal being connected to a positive or negative electrode of the battery or one of the batteries, the battery module further including a movable contact within the case for making and breaking the connection between one of the output terminals and the positive or negative electrode of the battery or one of the batteries to which the movable contact is connected, and a manually operable operating element for moving the movable contact to make and break the connection, the manually operable operating element being mounted on the case and at least partially extending outside of the case so as to be accessible for manual operation by a user, wherein the operating element is a screw for making and breaking the connection by movement with respect to the contact, the screw having an insulator at an interface with the contact.

2. A battery module according to claim 1, wherein the screw is always mounted on the case so that at least one portion is disposed outside of the case.

3. A battery module according to claim 2, wherein the screw includes the insulator as another portion always disposed inside of the case and engageable with the movable contact to enable movement for making and breaking the connection.

* * * * *